United States Patent [19]

Rutter et al.

[11] Patent Number: 5,328,000
[45] Date of Patent: Jul. 12, 1994

[54] FOOT ACTUATED WHEEL BRAKE

[75] Inventors: Bryce G. Rutter, St. Louis County; James D. Houseman, St. Charles County, both of Mo.

[73] Assignee: SAF-T-LOC, Inc., Corpus Christi, Tex.

[21] Appl. No.: 980,096

[22] Filed: Nov. 23, 1992

Related U.S. Application Data

[63] Continuation of Ser. No. 783,817, Oct. 29, 1991, abandoned.

[51] Int. Cl.$^5$ .......................... B60B 33/00; B62B 5/04
[52] U.S. Cl. ..................................... 188/1.12; 188/19; 188/29; 188/74; 188/1.11
[58] Field of Search ................. 188/1.12, 2 F, 24.18, 188/29, 74, 265, 1.11, 19; 280/33.994; 16/35; D34/12, 17, 27

[56] References Cited

U.S. PATENT DOCUMENTS

| | | | |
|---|---|---|---|
| 991,241 | 5/1911 | Rae | 188/265 X |
| 1,555,839 | 10/1925 | Fries et al. | 16/35 R |
| 2,448,216 | 8/1948 | Gokey | 188/29 X |
| 2,494,696 | 1/1950 | Forbes | 16/35 |
| 2,572,548 | 10/1951 | Weisz | 16/35 |
| 2,695,683 | 11/1954 | Forbes | 188/77 |
| 2,707,794 | 5/1955 | Kramcsak, Jr. | 16/35 |
| 2,709,828 | 6/1955 | Noelting | 16/35 |
| 3,162,888 | 12/1964 | Möbus | 16/35 |
| 3,402,692 | 4/1968 | Hickman | 116/115 |
| 3,500,965 | 3/1970 | Nossokoff et al. | 188/29 |
| 3,571,842 | 3/1971 | Fricke | 16/35 |
| 3,772,733 | 11/1973 | Stosberg et al. | 188/1.12 X |
| 3,811,535 | 5/1974 | Preusser | 188/29 |
| 3,860,992 | 1/1975 | Legg | 16/35 |
| 4,570,288 | 2/1986 | Kassai | 16/35 |
| 4,941,552 | 7/1990 | Screen | 188/1.12 |

FOREIGN PATENT DOCUMENTS

| | | | |
|---|---|---|---|
| 370505 | 5/1990 | European Pat. Off. | 16/35 R |
| 564239 | 5/1931 | Fed. Rep. of Germany . | |
| 611222 | 3/1935 | Fed. Rep. of Germany | 16/35 R |

Primary Examiner—Robert J. Oberleitner
Assistant Examiner—Peter M. Poon
Attorney, Agent, or Firm—Polster, Lieder, Woodruff & Lucchesi

[57] ABSTRACT

A foot actuated wheel brake for shopping carts and other wheeled equipment is disclosed. The wheel brake is designed for at least one wheel in a wheeled cart where each wheel is rotatably supported on a yoke at a lower end of a leg support in the wheeled cart. The wheel brake includes a first foot pedal that extends above and is movably mounted to the yoke. Preferably, the first foot pedal has a red colored stop sign shape. A second foot pedal extends laterally outwardly beyond the yoke and is movably mounted to the first foot pedal. Preferably, the second foot pedal has a green colored curvilinear shaped element that extends outwardly beyond the red colored stop sign shape. Operating engaging/disengaging structure is associated with the first and second foot pedals for moving the brake shoe into braking engagement with the wheel when the first foot pedal is engaged and for releasing the brake shoe from the wheel when the second foot pedal is engaged. The foot actuated wheel brake of the present invention may be used on existing shopping carts as well as on original equipment.

9 Claims, 6 Drawing Sheets

FOOT ACTUATED WHEEL BRAKE

This is a continuation application of copending application Ser. No. 07/783,817, filed on Oct. 29, 1991 now abandoned.

BACKGROUND OF THE INVENTION

The present invention relates to a foot actuated wheel brake for shopping carts or other wheeled equipment, and more particularly, to a positive locking and quick release foot actuated wheel brake for selective braking engagement of a rotatably mounted wheel on a shopping cart or other wheeled equipment.

Numerous wheel braking devices have been developed for engaging a wheel in various wheel carts and equipment to stop the movement of the equipment. In most cases, the brake devices are designed for use only on a single wheel since by stopping the rotation of a single wheel, the entire wheel cart can be immobilized. Some typical examples of brake devices are shown in U.S. Pat. Nos. 2,572,548; 2,695,683; 2,709,828; 3,571,842 and 3,860,992. The wheel brakes shown in these patents, as well as many other designs which have been constructed to address the problem, disclose useful features and constructions, although they have found limited use in shopping carts. In the early 1990's, there have been no substantial inroads of prior art wheel brake devices in shopping carts.

There are millions of shopping carts used in the United States and other foreign countries; however, at the present time, the foot actuated wheel brake has not been incorporated in such equipment, for several important reasons. These include the fact that such wheel brake devices have not been designed with both the consumer and store owner in mind. That is, prior art wheel brakes have not been constructed so as to be both user friendly to the consumer, as well as to being economical to the store owner. A further reason is that such prior art wheel brake devices have not been easy to use when they do not provide a positive locking and unlocking engagement of a wheel on a repetitive basis over a sustained period of time. As a result, the many problems associated with shopping carts remain.

These problems include the difficulty of loading a car from a shopping cart or trying to file a place to leave the shopping cart, after use. Almost everyone has experienced the difficulty of unloading groceries or other products from a shopping cart into a car. Without a wheel braking device, the shopping cart can easily roll away, and this requires the user to somehow hold on to the cart, while unloading it. Consumers are use to holding the shopping cart with their feet or holding the cart with other parts of their bodies against the cart, while unloading the contents of the cart into a car. This particular problem is more than a frustrating experience because the shopping cart could easily roll away and damage the user's car or other cars nearby, as well as the cart itself.

Injury to other people is a related problem with runaway carts. For example, shopping cart injury is one of the leading causes of injuries to children. Thus, the problems of a runaway cart may create frustrating experiences during use, but also impose serious risk or exposure to both the property of others and bodily injury to users.

Runaway shopping carts have been clocked at speeds exceeding 30 m.p.h. in high winds. As will be appreciated, carts travelling at such high rates of speed can cause serious injury to both pedestrians and motorists. During periods of high winds, damage to vehicles also increases, because the carts can become easily dislodged. Damage to the carts, resulting in repair and/or replacement by the store owner, is a continuing problem. A store owner may also be faced with increases in insurance premiums and deductibles. Because repair of minor shopping cart damage can cost $200.00 or more, the store owner's insurance and deductibles are typically not sufficient to cover the cost associated with repairing damage to vehicles and the carts.

Following use of the shopping cart, the user looks for a place to leave the cart where it will not roll away. Typically, cart corrals have been developed for storing and nesting shopping carts after use. While users are expected to position the shopping cart in the cart corral after use, for a variety of reasons, many shoppers do not use cart corrals. As a result, this creates another potential runaway cart problem where inclines and/or high winds cause the cart to move to an unwanted location.

The foot actuated wheel brake of the present invention has been constructed to overcome all of the aforementioned problems that are primarily associated with shopping carts. Additionally, the foot actuated wheel brake of the present invention can also be used on other types of wheel equipment, as may be desired.

SUMMARY OF THE INVENTION

Among the several objects and advantages of the present invention include:

The provision of a new and improved foot actuated wheel brake for shopping carts and other wheeled equipment;

The provision of the aforementioned foot actuated wheel brake which is user friendly from the standpoint of both the consumer who uses the cart as well as the store owner who makes the cart available to consumers;

The provision of the aforementioned foot actuated wheel brake which has a positive locking and quick release mechanism for selective releasable braking engagement with the wheel in a wheeled cart;

The provision of the aforementioned foot actuated wheel brake which enables a user to easily apply a positive braking force through one foot pedal while releasing the braking force through a second foot pedal;

The provision of the aforementioned foot actuated wheel brake which has highly distinguishable and visually distinctive brake and release pedals;

The provision of the aforementioned foot actuated wheel brake which has been designed with economics in mind by using a minimum number of parts, but without sacrificing the need for quick and reliable brake and release mechanisms;

The provision of the aforementioned foot actuated wheel brake which eliminates the problems of runaway shopping carts, so as to eliminate injury and inconvenience to users, damage to vehicles, and damage to carts, while also minimizing increases in insurance premiums and deductibles;

The provision of the aforementioned foot actuated wheel brake which is long lasting and durable, requires little maintenance or replacement of parts, is economical to manufacture by existing technology, is simple to operate by people of all ages, and is otherwise well adapted for the purposes intended.

Briefly stated, the foot actuated wheel brake of the present invention preferably is associated with at least one wheel in a wheeled cart where each such wheel is rotatably supported on a yoke at a lower end of a leg support in the wheeled cart. The yoke includes a pair of generally parallel downwardly extending arms with the wheel rotatably mounted on an axle extending between the arms. The first foot pedal is movably mounted to the yoke and includes a brake shoe for engaging the wheel. The second foot pedal is movably mounted relative to the first foot pedal. Cooperating engaging/disengaging means are associated with the first and second foot pedals for moving the brake shoe into braking engagement with the wheel when the first foot pedal is engaged and for releasing the brake shoe from the wheel when the second foot pedal is engaged.

Preferably, the first foot pedal extends above the yoke and has a red colored stop sign shape. The second foot pedal extends laterally beyond the yoke and has a green color of generally partially curvilinear shape to distinguish from the first foot pedal shape. Thus, both foot pedals are visually distinctive.

The first foot pedal is spring biased in movably mounted position relative to the yoke. The second foot pedal is also spring biased, but is movably mounted relative to the first foot pedal. The first foot pedal functions as a locking means to move the brake shoe into locking engagement with the wheel while the second foot pedal functions as a release means to release the brake shoe from the wheel when the second foot pedal is engaged.

In the preferred construction, a portion of the upper wall of the yoke, which connects a pair of depending generally parallel downwardly extending arms, is also downwardly angularly offset from the upper wall adjacent one end thereof. An inner wall section is attached to the generally parallel downwardly extending arms along one side of the yoke in generally parallel and spaced relationship to the downwardly angularly offset portion of the upper wall of the yoke. Typically, an inverted U-shaped bracket with depending side sections is provided for securing the depending side sections to the depending arms of the yoke, to position the corresponding angularly offset inner wall section in generally parallel and spaced relationship to the downwardly angularly offset portion of the upper wall of the yoke.

A lock pedal is provided which includes a lock shaft that extends through and is slidably mounted with respect to the angularly offset upper wall portion and inner wall section. The stop pedal is mounted to an upper end of the lock shaft above the angularly offset upper wall portion and a brake shoe is mounted to the lower end of the lock shaft below the angularly offset inner wall section. When the stop pedal is depressed, the brake shoe is moved into braking engagement with the wheel.

A binding/release pedal has an opening for slidable mounting on the lock shaft between the angularly offset upper wall portion and the inner wall section. The binding/release pedal has an outer end for depressible engagement and release of the binding/release pedal from the lock shaft. An inner end of the binding/release pedal is adapted to contact an undersurface of the substantially horizontally directed upper wall in proximity to the angularly offset upper wall portion. The dimensional tolerances between the opening in the binding/release pedal and the lock shaft is such that the binding/release pedal is able to grip and bind or permit slidable movement relative to the lock shaft depending on the angular position of the binding/release pedal.

Return spring means are mounted on the lock shaft between the stop pedal and the angularly offset upper wall portion of the yoke to resiliently bias the stop pedal in an upper position, thus locating the brake shoe in spaced position from the wheel.

The binding/release spring means are mounted on the lock shaft between the binding/release pedal and the inner wall section. The binding/release spring means operates to move the binding/release pedal to a predetermined angularly offset position for binding engagement with the lock shaft when the stop pedal is depressed in order to maintain the brake shoe in braking engagement with the wheel. The binding/release spring means is disengaged from the lock shaft upon depression of the outer free end of the binding/release pedal to disengage same from the lock shaft and enable the return spring means to move the stop pedal to its upper position for subsequent engagement by a user.

The binding/release pedal is angularly offset relative to the lock shaft both in binding and release engagement positions relative to the lock shaft, and preferably angularly offset to the lock shaft at a slightly greater angle when in binding engagement with the lock shaft. The binding/release spring means maintains the inner end of the binding/release pedal in engagement with the undersurface of the substantially horizontally directed upper wall throughout the relative angular offset movements thereof. Typically, both the return spring means and the binding/release spring means are coil springs surrounding the lock shaft.

The brake show includes impingement means for braking engagement with the wheel. In this connection, preferably the brake shoe comprises an inverted U-shaped element including a connecting wall and depending walls extending downwardly therefrom. Outer free ends of the depending walls are adapted to engage the wheel while the connecting wall is deformed for spring action engagement with the wheel. Spring action engagement not only occurs through the deformation of the connecting wall, but also because of the compression of the return spring, which also exerts downward spring action on the connecting wall, and thus on the outer free ends of the depending walls of the inverted U-shaped brake shoe element.

These and other objects and advantages of the present invention will become apparent from the following description.

BRIEF DESCRIPTION OF THE DRAWINGS

In the drawings.

Corresponding reference numerals will be used throughout the several figures of the drawings.

DESCRIPTION OF THE PREFERRED EMBODIMENT

The following detailed description illustrates the invention by way of example and not by way of limitation. The description will clearly enable one skilled in the art to make and use the invention, and describes several embodiments, adaptions, variations, alternatives and uses of the invention, including what we presently believe is the best mode of carrying out the invention.

Figure 1:
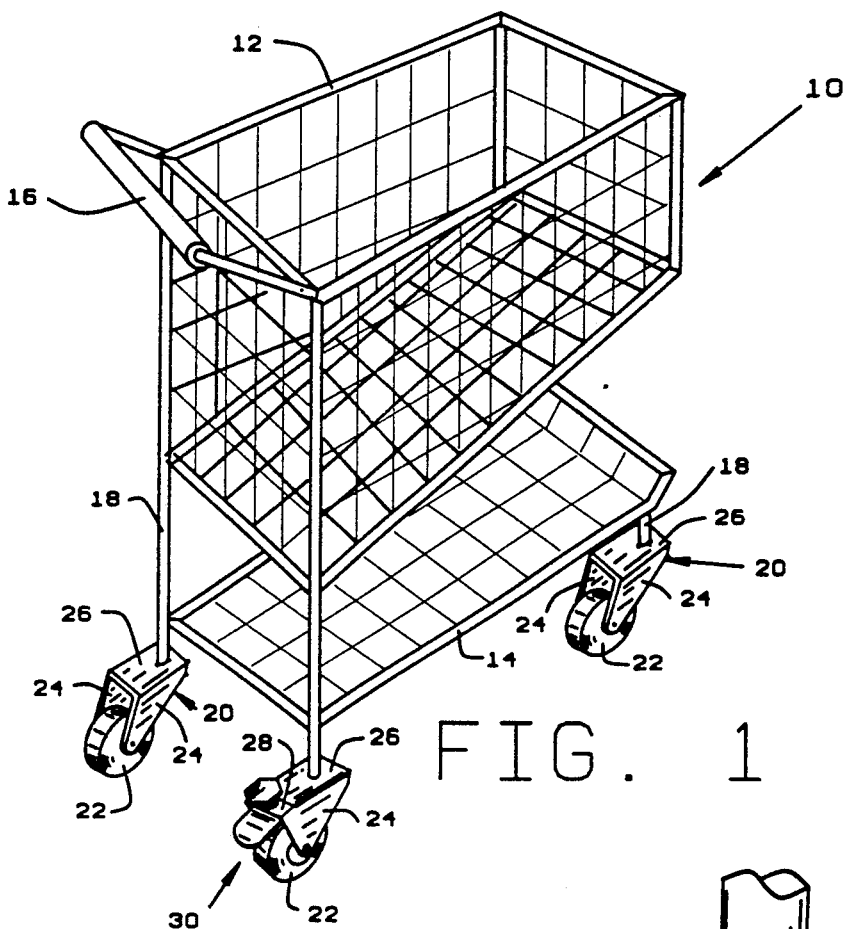
FIG. 1 is a perspective view of a typical shopping cart with the foot actuated wheel brake of the present invention mounted on the right rear wheel thereof.

The foot actuated wheel brake of the present invention is designed primarily for use in connection with shopping carts as shown in FIG. 1 of the drawings, although it will also be understood that the present invention may be used on other types of wheeled equipment or carts, as may be desired. Also, while it is understood that the components of the wheel brake of the present invention may be made from any material or combination of materials, metal is the preferred material for the components described below.

Since the foot actuated wheel brake of the present invention is preferably used in connection with a shopping cart, there is shown in FIG. 1 a typical shopping cart 10 which is illustrated as having a large wire basket 12, a lower wire shelf 14 and a handle 16. At the rear of the shopping cart, a spaced pair of long leg supports 18 interconnect the large wire basket 12 and lower wire shelf 14. The interconnecting leg supports 18 extend below the lower wire shelf 14 and are attached to a interconnecting yokes 20 which support the wheels 22. At the front of the cart, there are smaller leg supports 18 which only extend between the lower wire shelf 14 and interconnecting yokes 20, as shown. The particular shape and construction of the shopping cart is varied to suit the particulars desired, one typical form which is shown in FIG. 1 of the drawings.

Figure 2:
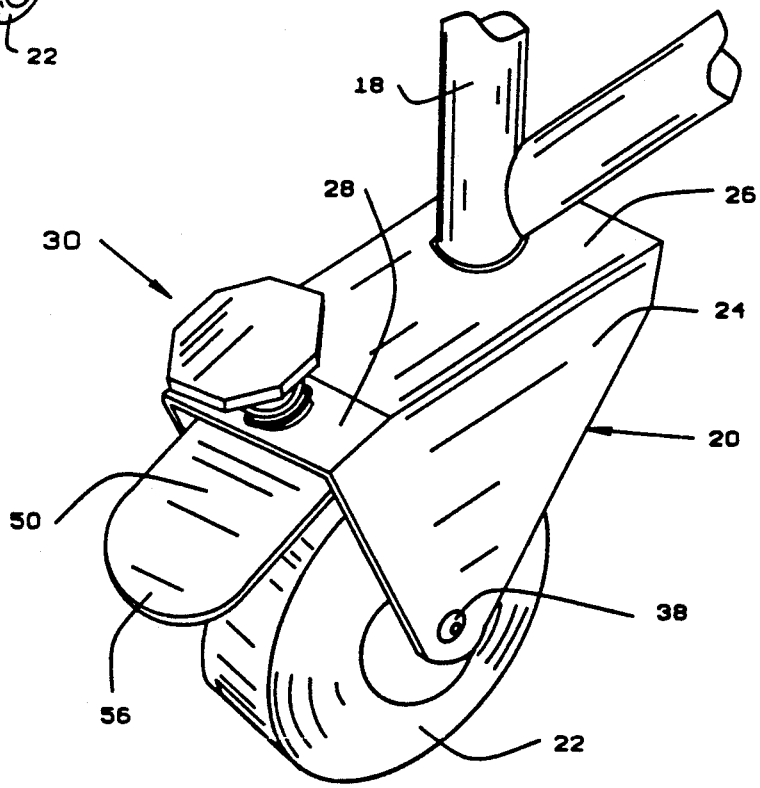
FIG. 2 is an enlarged perspective view of the foot actuated wheel brake of the present invention as mounted to the right rear wheel of the shopping cart, as shown in FIG. 1.

Also, the shape and construction of the yokes 20 and the manner in which they are attached to the leg supports 18 can be varied to suit the particulars desired. Whatever the shape or construction of the yokes 20, they preferably include a pair of generally parallel downwardly extending arms 24, 24 which are interconnected to an integral upper wall or bight end portion 26, to which the leg support 18 is secured as best seen in FIGS. 1-2 of the drawings.

Figure 15:
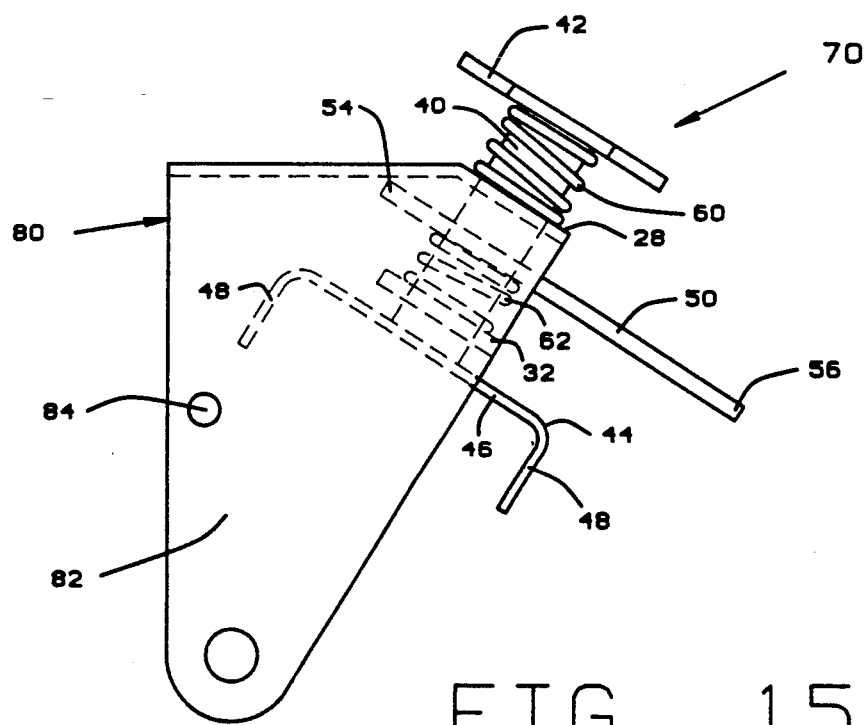
FIG. 15 shows a modified form of foot actuated wheel brake of the present invention in which the illustrated yoke is adapted to be mounted over an existing yoke on a shopping cart, in order to adapt or retro-fit an existing shopping cart with the foot actuated wheel brake of the present invention.

The foot actuated wheel brake of the present invention may be constructed as original equipment when the shopping cart is produced or, alternatively, the foot actuated wheel brake of the present invention may be added to existing shopping carts. In this connection, FIGS. 1-10 show the foot actuated wheel brake 30 of the present invention constructed as an original equipment product, while FIG. 15 shows a typical modified yoke construction enabling a modified form of foot actuated wheel brake to be mounted directly upon the yoke in existing equipment. The prior art has contemplated wheel brake constructions in either the original equipment format or as an add-on to existing equipment.

Figure 3:
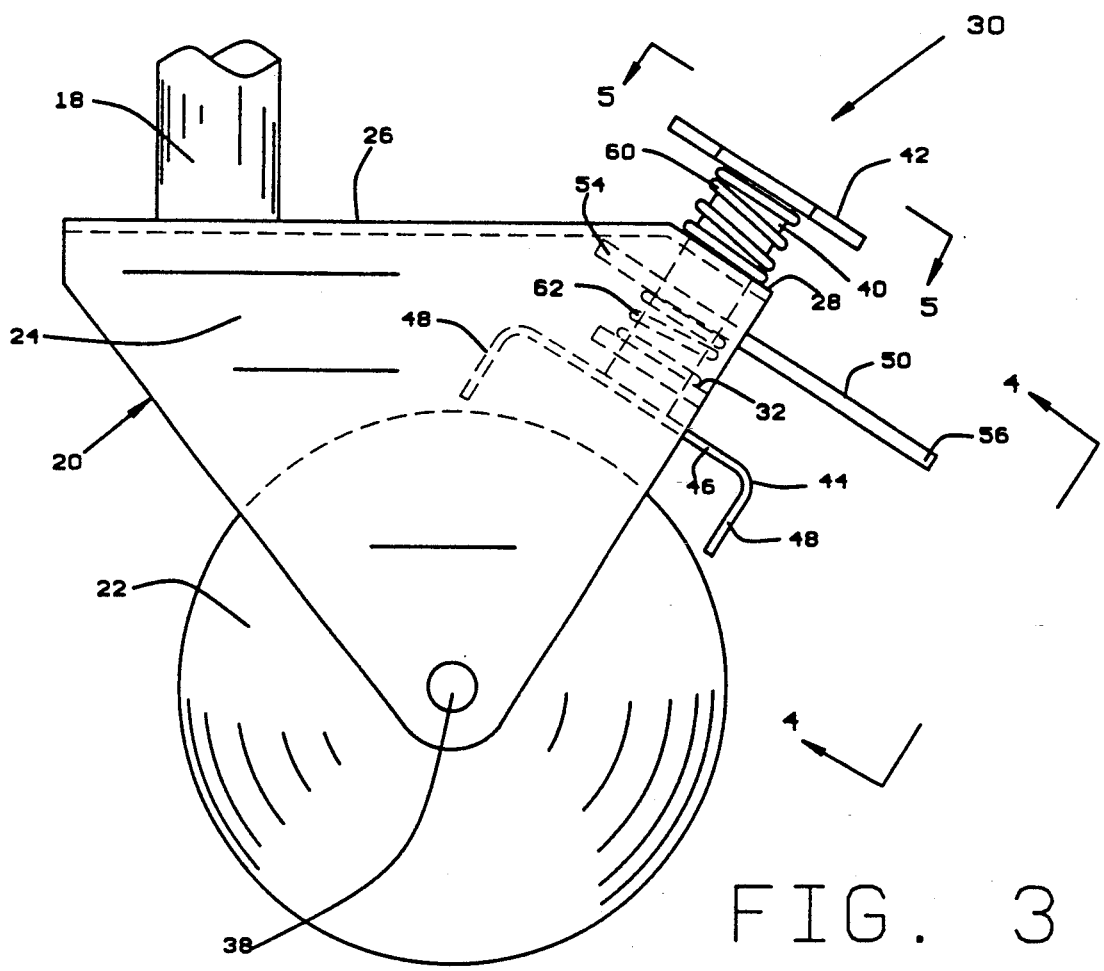
FIG. 3 is a further enlarged side elevational view, partially in phantom lines, illustrating the foot actuated wheel brake of the present invention in released or disengaged position relative to an associated wheel.
Figure 4:
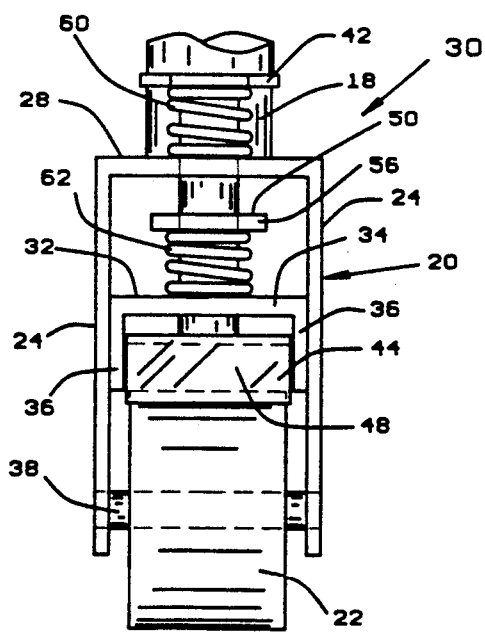
FIG. 4 is a fragmentary end elevational view of the foot actuated wheel brake of the present invention, as seen along lines 4—4 of FIG. 3.

Reference is now made to FIGS. 1-10 of the drawings which show the foot actuated wheel brake 30 of the present invention incorporated as original equipment on the right rear yoke 20 of the shopping cart 10. In the preferred embodiment, a portion of the upper wall 26 of the yoke 20 is downwardly angularly offset at 28 from the upper wall 26 adjacent one end of the yoke 20, in order to enable the foot actuated wheel brake 30 to be mounted with respect thereto as best shown in FIGS. 2-5 of the drawings. Spaced from the angularly offset upper wall portion 28 is an inner wall section 32 that is generally of the same size as the angularly offset upper wall portion 28 and is also in generally parallel relationship thereto so as to provide a generally offset inner wall section 32. The angularly offset inner wall section 32 is preferably part of an inverted U-shaped bracket 34, as best seen in FIG. 4 of the drawings, which includes depending side sections 36 that are secured to the depending side arms 24, 24 of the yoke 20. The foot actuated wheel brake 30 is mounted to the yoke 20 with respect to the angularly offset portion 28 and inner wall section 32, as will be described below. An axle 38 extends through lower corner portions of the depending arms 24, 24 for securing the wheel 22 in a rotatably mounted position with respect to the yoke 20, as is well known.

The foot actuated wheel brake 30 includes a lock shaft 40 that extends through and is slidably mounted with respect to openings (not shown) in the angularly offset upper wall portion 28 and the inner wall section 32. The stop pedal 42 is mounted to the upper end of the lock shaft 40 above the generally offset upper wall portion 32 of the yoke and a brake shoe 44 mounted to a lower end of the lock shaft 40 below the angularly offset smaller inner wall section 32. The stop pedal 42 and brake shoe 44 may be secured by any well known fastening technique to the lock shaft 40. Preferably, the lock shaft 40 has a non-circular shape, i.e., a square shape is shown in the drawings, to prevent the lock shaft from rotating with respect to the openings in the angularly offset upper wall portion 28 and the inner wall section 32, in order to maintain the various components of the foot actuated wheel brake 30 in desired operating position.

For maintaining the stop pedal 42 in an upper position such that the brake shoe 44 is spaced from the outer surface of the wheel 22, as shown in FIG. 3 of the drawings, a return spring in the form of a coil spring 60 surrounds the lock shaft 40 and is located between the undersurface of the stop pedal 42 and the angularly offset upper wall portion 28 of the yoke 20. Thus, in the upper or non-engaged position, the stop pedal 42 and the brake shoe 44 are located in the position shown in FIGS. 3 and 6 of the drawings.

The stop pedal 42 is preferably constructed in an octagonal or eight sided stop sign shape and is electrostatically painted or otherwise provided with a red coating such that the red colored stop sign shaped stop pedal 42 is easily visible by a user. As will be explained in detail hereafter, when it is desired to stop the shopping cart, the stop pedal 42 is simply depressed to move the brake shoe into braking engagement with the wheel 22. The highly visible and distinctive red colored stop sign shaped pedal 42 enables a user to know what must be done to stop the cart, when desired.

The brake shoe 44 attached to the other end of the lock shaft 40 is shown as an inverted U-shaped element including a connecting portion 46 which is attached to the lower end of the lock shaft 40 and a pair of depending walls 48, 48 which extend downwardly from the connecting wall 46. As explained below, the lower ends of the depending walls 48, 48 of the brake shoe serve as impinging elements with respect to the wheel 22 when the brake shoe 44 is positioned into braking engagement with the wheel 22. At that time, the connecting wall 46 deforms or flexes somewhat, so as to apply a spring action engagement at the lower ends of the depending walls 48, 48 against the outer surface of the wheel 22 so as to totally immobilize same.

Figure 5:
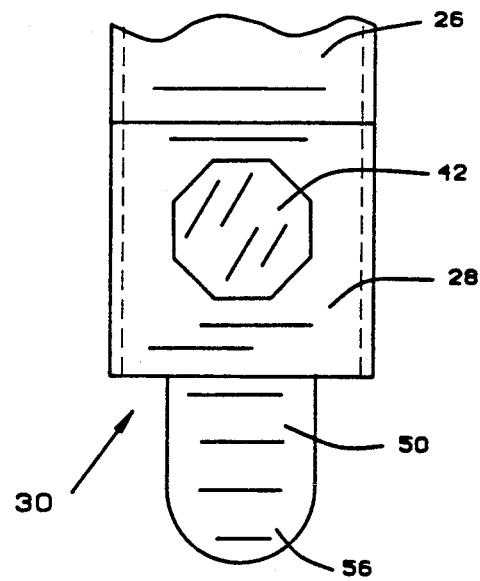
FIG. 5 is a fragmentary top plan view of the foot actuated wheel brake of the present invention, as viewed along lines 5—5 of FIG. 3.

The foot actuated wheel brake 30 further includes a binding/release pedal 50 which is provided with a square shaped opening 52 for receiving the square shaped lock shaft 40. In order to provide the desired binding and release functions, the dimensional tolerances between the opening 52 in the binding/release pedal and the dimensions of the lock shaft 40 are important, as will be discussed below. An inner end 54 of the binding/release pedal 50 is adapted to contact an undersurface of the substantially horizontally directed upper wall 26 of the yoke 20, in proximity to the angularly offset upper wall portion 28, for maintaining the binding/release pedal 50 in predetermined angular positions, as will be described. The outer free end 56 of the binding/release pedal 50 has a generally or non-stop sign configuration, as shown in FIGS. 2 and 5 of the drawings, to distinguish from the stop pedal 42. Also, the length of the binding/release pedal 50 is sufficient to enable the free end 56 to extend laterally outwardly beyond the yoke 20, as well as outwardly beyond the stop pedal 42, in order to enable a user to easily distinguish between the stop pedal 42 and the binding/release pedal 50. Also, the curvilinear outer free end of the binding/release pedal 50 is also preferably electrostatically painted in a green color or is otherwise provided with a green coating to enable a user to depress and activate the binding/release pedal 50, when it is desired to disengage the brake shoe 44 from the wheel 22.

Figure 6:
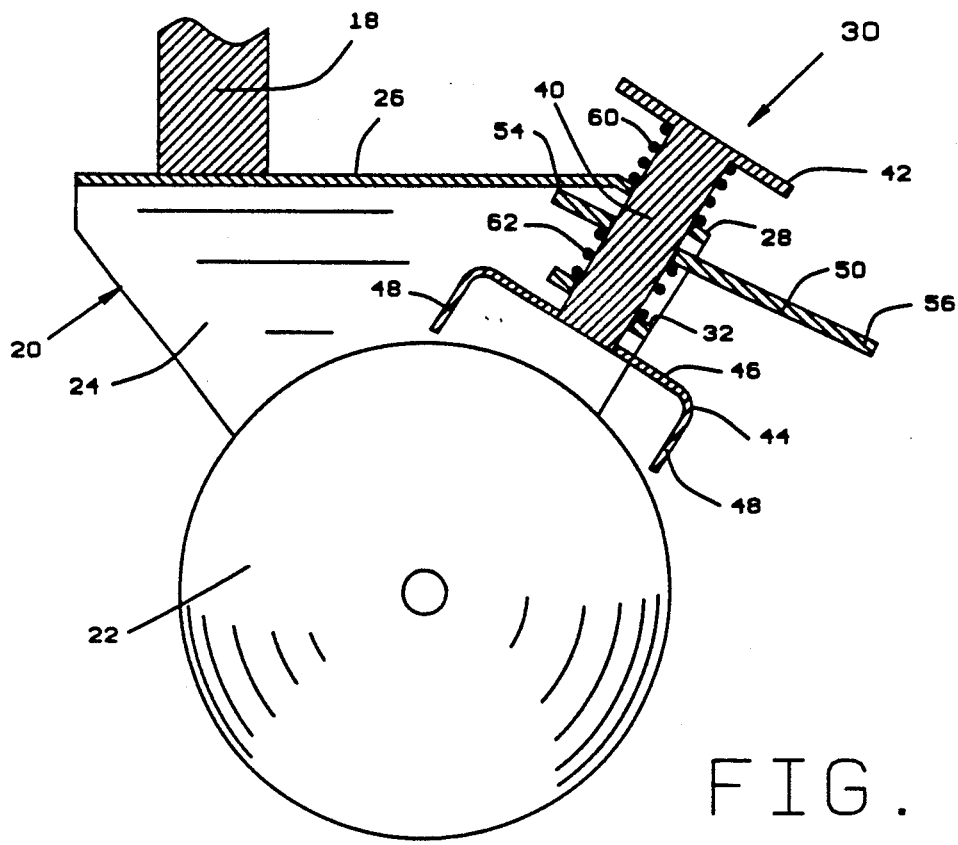
FIG. 6 is a side sectional view of the actuated wheel brake shown in FIGS. 1-5 of the drawings in disengaged or released position relative to an associated wheel.

To assist the stop pedal 42 and the binding/release pedal 50 in performing the desired engaging/release functions to be described, a return spring 60 is positioned between the lower surface of the stop pedal 42 and the angularly offset upper wall portion 28, so as to maintain the stop pedal 42 in an upper position, as shown in FIGS. 3 and 6 of the drawings, where the brake shoe 44 is disengaged from the wheel 22. Also, a binding/release spring 62 is positioned about the lock shaft 40 between the lower surface of the binding/release pedal 50 and the upper surface of the inner wall section 32. Both of these springs 60, 62 cooperate with one another and other components, to move the brake shoe 44 into braking engagement with the wheel when the stop pedal 42 is depressed and for releasing the brake shoe 44 from the wheel 22 when the binding/release pedal 50 is depressed.

In order to understand the operation of the foot actuated wheel brake 30 of the present invention, reference is made to FIGS. 6-14 of the drawings. FIGS. 6-10 show various engaged or released positions of the foot actuated wheel brake 30, while FIGS. 11-14 illustrates the manner in which the binding/release pedal 50 engages or is released from the lock shaft 40.

In FIG. 6 of the drawings, the foot actuated wheel brake 30 is shown in its upper or disengaged position where the return spring 60 resiliently biases the stop pedal 42 and the remaining components of the brake in an upper position, as illustrated, to hold the brake shoe 44 out of braking engagement with the wheel 22. In this position, the user may operate the shopping cart or other wheeled equipment as desired, with no interference from the foot actuated wheel brake 30.

Figure 7:
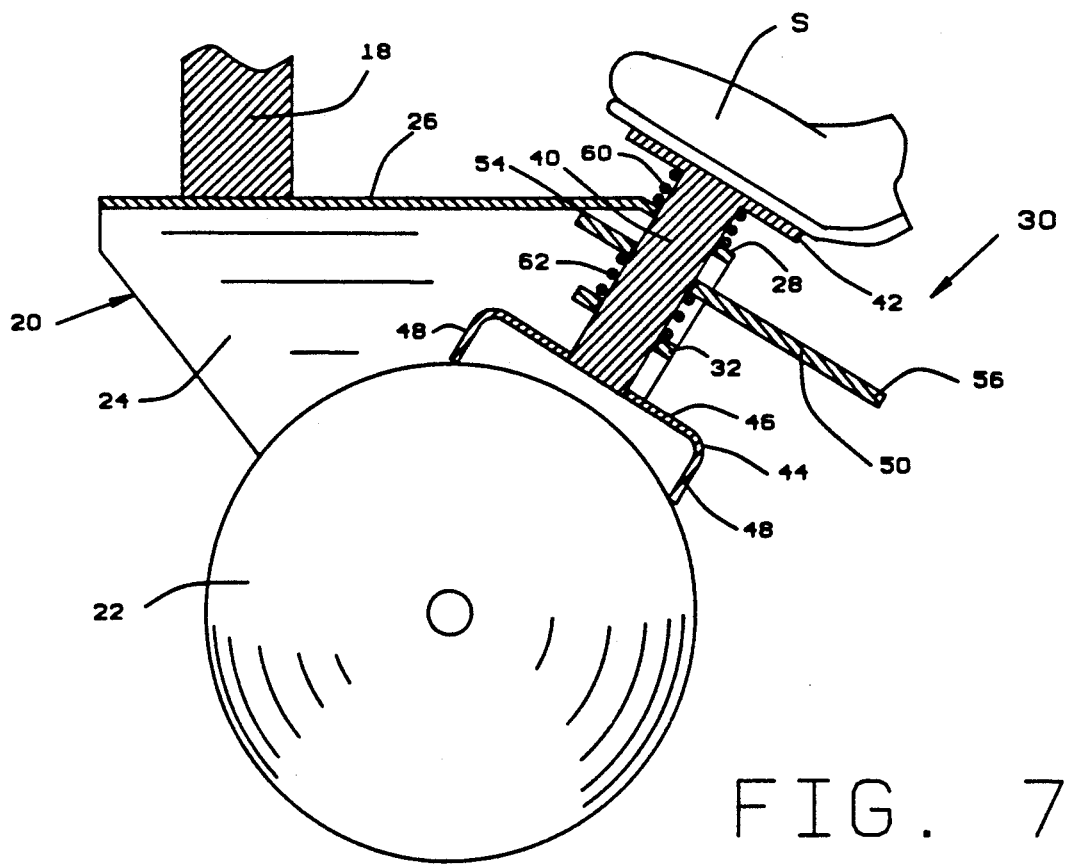
FIG. 7 is a side sectional view illustrating the foot actuated wheel brake being moved into engaged position relative to an associated wheel by a user depressing the stop sign shaped foot pedal that extends above the yoke element.
Figure 8:
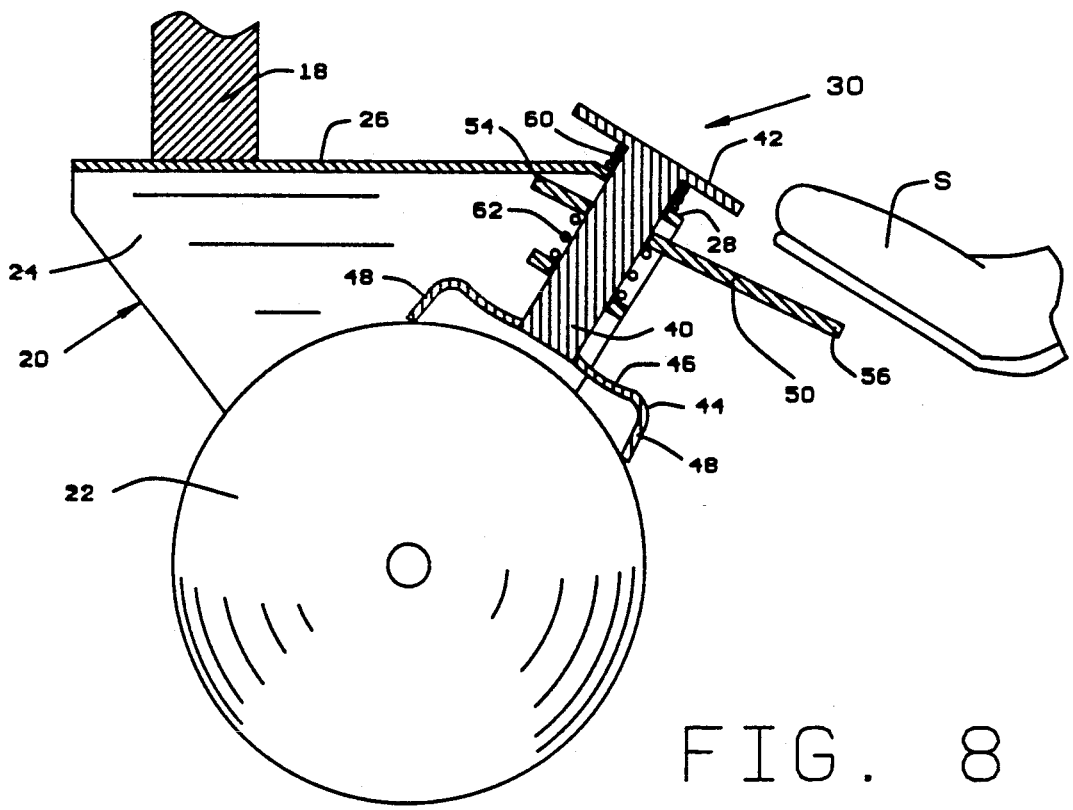
FIG. 8 is a side sectional view illustrating the foot actuated wheel brake in engaged position relative to an associated wheel.

When it is desired to stop the shopping cart 10 in a particular location, the user simply depresses the red colored stop sign shaped foot pedal 42 as is illustrated by the portion of the shoe S in FIG. 7 of the drawings. When the stop pedal 42 is depressed, the lock shaft 40 is rapidly moved downwardly compressing the return spring 60 and causing the depending walls 48, 48 of the brake shoe 44 to aggressively impinge upon and engage the wheel 22 in braking engagement. In FIG. 8, it is to be noted also that the connecting wall 46 of the inverted U-shaped brake shoe 44 is slightly deformed, to apply a spring action force through the depending walls 48, 48 in spring action braking engagement of the brake shoe 44 with the wheel 22. Even though the user's foot, represented by the shoe S, is removed from the stop pedal 42, there will be no upward movement of the lock shaft 40 or the brake shoe 44. This is due to the fact that the binding/release pedal 50 is, at that point, in binding engagement with the lock shaft 40.

The binding/release coil spring 62, upon downward movement of the lock shaft 40, causes the binding/release pedal 50 to move upwardly along the outer free end 56 thereof, while the inner end 54 pivots slightly against the undersurface of the upper wall 26 of the yoke 20. In other words, the binding/release spring 62 expands slightly to move the outer free end 56 into a predetermined upper angular position which is different from the position when the brake 30 is not actuated. When expansion of the binding/release spring 62 occurs, the stop pedal 50 is moved into binding engagement with the lock shaft 40.

Figure 11:
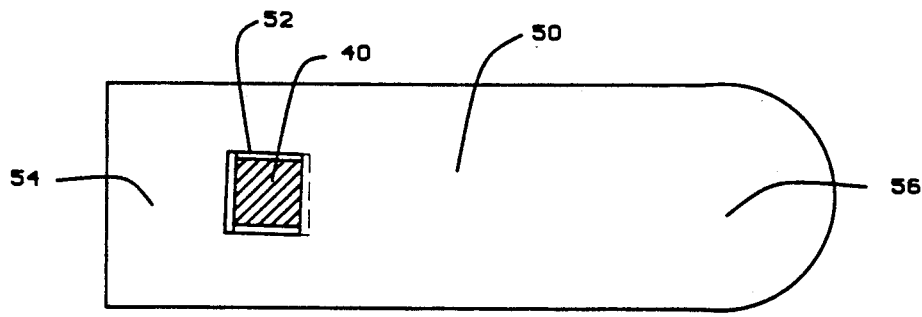
FIG. 11 is a top plan view of the siding/release pedal of the present invention illustrating the manner in which the sliding/released pedal engages the lock shaft for binding and gripping engagement therewith, when the foot actuated wheel brake is moved to the FIG. 8 engaged position.
Figure 12:
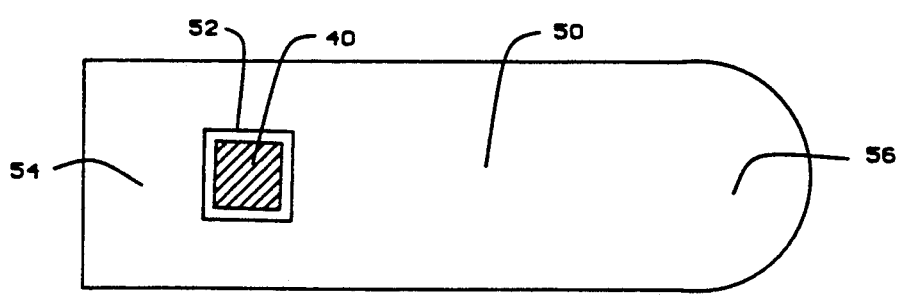
FIG. 12 is a top plan view of the binding/release pedal which allows for a movement of the lock shaft relative to the binding/release pedal when the foot actuated wheel brake is released, as shown in FIG. 9 of the drawings.
Figure 13:
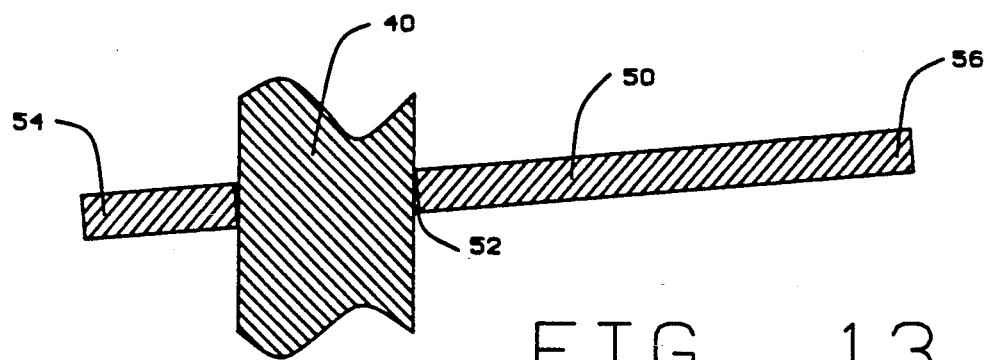
FIG. 13 is an enlarged fragmentary side sectional view illustrating the binding engagement between the binding/release pedal and the lock shaft in the foot actuated wheel brake of the present invention.
Figure 14:
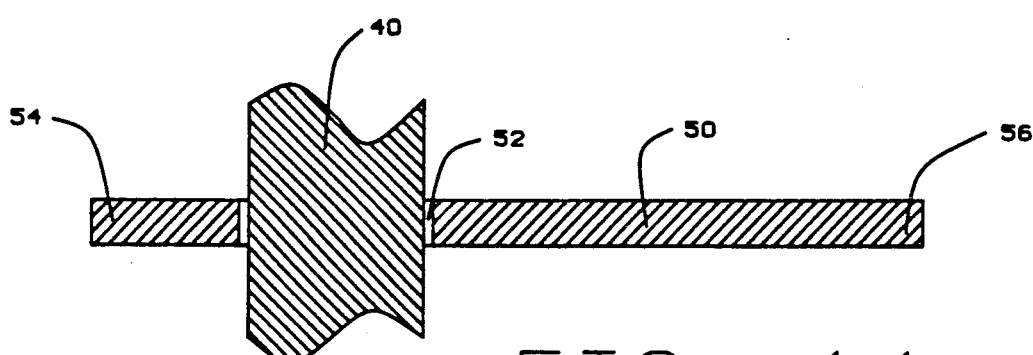
FIG. 14 is an enlarged fragmentary side sectional view of the binding/release pedal showing the nonbinding or released position relative to the lock shaft in the foot actuated wheel brake of the present invention.

As previously discussed, there are very close dimensional tolerances between the square-shaped opening 52 in the binding/release pedal 50 and the outer dimensions of the square-shaped lock shaft 40. As best seen in FIGS. 13-14 of the drawings, when the outer free end 56 of the stop pedal 50 is moved upwardly by the binding/release spring 62, it will be seen in FIG. 13 of the drawings that the inner wall periphery, surrounding the square-shaped opening 52 of the binding/release pedal 50, will engage outer surfaces of the square-shaped lock shaft 40 in binding engagement therewith. FIGS. 11-12 also show top plan views, the relative positions of the binding/release pedal relative to the lock shaft 40 in the binding position (FIG. 11) and in the release position (FIG. 12).

As a result, even though the user's foot, represented by the shoe S, is removed from the stop pedal 42, as shown in FIG. 8 of the drawings, the binding/release lever 50 engages the lock shaft 40 in binding, non-movable relationship thereto, such that the brake shoe 44 is maintained in active braking engagement with the wheel 22. Not only does the binding/release pedal 50 prevent the lock shaft 40 from moving upwardly, the lower ends of the depending walls 48, 48 of the brake shoe 44 aggressively impinge upon and engage the wheel 22 so as to prevent any rotation thereof. This effectively immobilizes the shopping cart 10, since non-rotation of a single wheel, preferably a wheel which is positioned adjacent a user, prevents the shopping cart from moving further. Accordingly, all of the aforementioned problems associated with runaway shopping carts are eliminated when the foot actuated wheel brake 30 is in engaged position, as is shown in FIG. 8 of the drawings.

Figure 9:
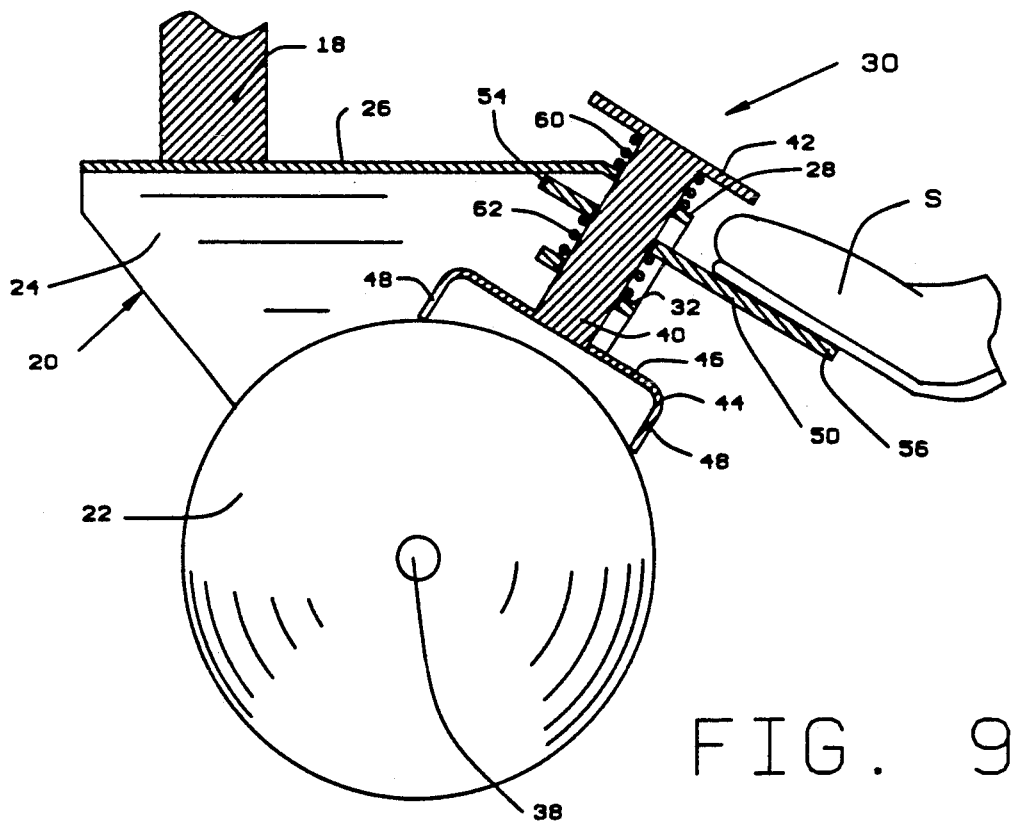
FIG. 9 is a side sectional view illustrating the foot actuated wheel brake as being disengaged or released relative to an associated wheel when the foot of the user depresses the separate and independent release pedal for this purpose.
Figure 10:
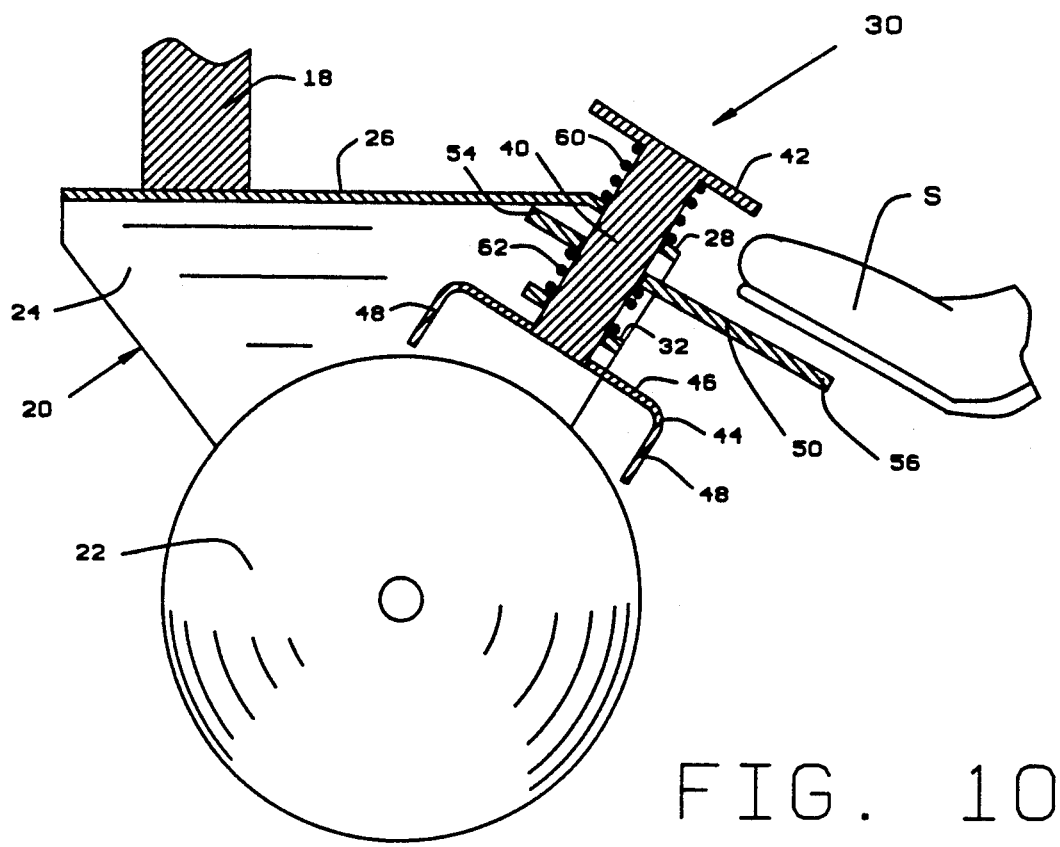
FIG. 10 is a side sectional view of the foot actuated wheel brake of the present invention illustrating the return of same to a engaged position, following release thereof.

At the same time, it is important that a user quickly disengage the foot actuated wheel brake 30 when it is desired to operate the shopping cart in a normal manner. This can be simply achieved by depressing the outer free end 56 of the binding/release pedal 50, which, is represented by the shoe S, as shown in FIG. 9 of the drawings. When a user's foot thus engages and depresses the outer free end 56 of the binding/release pedal 50 as shown in FIG. 9 of the drawings, the binding/release pedal 50 is moved downwardly sufficiently to enable the lock shaft 40 to be disengaged from the lever 50, and allowing the shaft 40, stop pedal 42 and brake element 44 to be moved from the position shown in FIG. 9 to the upper disengaged position as shown in FIG. 10, where the foot S is shown as being moved a short distance away from the binding/release pedal 50.

In operating the binding/release pedal 50 to release the brake shoe 44, a simple downward movement of the binding/release pedal 50 causes the spring 62 to be compressed and the binding/release pedal 50 to be slightly pivoted again in an opposite direction against the undersurface of the upper wall 26 of the yoke. This causes the opening 52 in the binding/release lever to be quickly moved into the non-binding spaced position relative to the lock shaft 40, as shown in FIGS. 12 and 14, where the return spring 64 can rapidly return the lock shaft 40, including the stop pedal 42 and the brake shoe 44 to an upper non-engaged position relative to the wheel 22.

In addition to the original equipment model shown in FIGS. 1-10 of the drawings, FIG. 15 of the drawings shows a foot actuated wheel brake 70 which has the same components as the foot actuated wheel brake 30 in the FIGS. 1-10 embodiments. The difference is that the yoke 80 is an add-on or retro-fit yoke with smaller depending arms 82 and openings 84 for receiving suitable fastening means to attach the add-on or retro-fit yoke 80 to an existing yoke on a shopping cart currently in the field. Thus, the foot actuated wheel brake of the present invention can be used in the original equipment construction shown in FIGS. 1-10 of the drawings or, if desired, an add-on or retro-fit can be employed, as shown in FIG. 15 of the drawings.

From the foregoing, it will now be appreciated that the foot actuated wheel brake of the present invention provides a consumer with easily visible and highly recognizable stop pedals and release pedals, suitably shaped and colored, to quickly instruct the user, without training, in the operation of the foot actuated wheel brake of the present invention. The red colored stop sign shaped stop pedal and green colored generally curvilinear shaped release pedal allows a user to quickly and easily determine the desired functions in the operation of the foot actuated wheel brake. When the stop pedal is depressed, there is a positive locking and binding engagement of the binding/release pedal with the lock shaft, causing the brake shoe to aggressively impinge upon and contact the wheel in braking engagement. Simple depression of the binding/release pedal releases the binding engagement of the lock shaft, enabling a return spring to move the lock shaft, associated stop pedal and brake shoe to an upper non-engaged position for subsequent use.

The user friendly foot actuated wheel brake of the present invention thus provides a highly effective, economical and durable foot actuated wheel braking device that serves the needs of both the user as well as the store owner who provides the shopping cart. As a result, a highly effective selective foot actuated braking device has been developed which achieves the several objects and features of the invention, as well as provide other advantageous results.

As various changes could be made in the above constructions without departing from the scope of the invention, it is intended that all matter contained in the above description or shown in the accompanying drawings shall be interpreted as illustrative and not in a limiting sense.

We claim:

1. A wheel brake comprising:
   a yoke depending from a lower end of a leg support and including a pair of generally parallel downwardly extending arms, said arms being joined to one another at an upper end thereof by a substantially horizontally directed upper wall, a portion of the upper wall being downwardly angularly offset from the upper wall adjacent one end thereof;
   a wheel rotatably mounted on an axle extending between the generally parallel arms of said yoke;
   an angularly offset inner wall section attached to said generally parallel arms along one side of said yoke in generally parallel and spaced relationship to the downwardly angularly offset portion of the upper wall of said yoke;

a stop pedal including a lock shaft extending through and slidably mounted with respect to said angularly offset upper wall portion and inner wall section, the stop pedal mounted to an upper end of said lock shaft above said angularly offset upper wall portion and a brake shoe mounted to a lower end of said lock shaft below said angularly offset inner wall section, said stop pedal adapted to be depressed to move said brake shoe into braking engagement with said wheel;

a binding/release pedal having an opening for slidably mounting same on said lock shaft between said angularly offset upper wall portion and inner wall section, the dimensional tolerances between the opening in said binding/release pedal and said lock shaft being such as to enable said binding/release pedal to grip and bind or permit slidable movement relative to said lock shaft depending on the angular position of said binding/release pedal, said binding/release pedal having an inner end adapted to contact an undersurface of said yoke upper wall, said binding/release pedal further having an outer free end for depressible engagement and release of said binding/release pedal from said lock shaft;

return spring means mounted on said lock shaft between said stop pedal and the angularly offset upper wall portion of said yoke to resiliently bias said stop pedal in an upper position where said brake shoe is spaced from said wheel;

binding/release spring means mounted on said lock shaft between said binding/release pedal and said angularly offset inner wall section, said binding/release spring means being expanded when said stop pedal is depressed to move said binding/release pedal to an upper predetermined angular offset position for binding engagement with said lock shaft in order to maintain said stop pedal in a depressed position while urging said brake shoe in braking engagement with said wheel, said binding/release spring means being disengaged from said lock shaft upon depression of the outer free end of said binding/release pedal to move said binding/release pedal to a lower release position relative to said lock shaft and enable the return spring means to move the stop pedal to its upper position for subsequent re-engagement by a user.

2. The wheel brake as defined in claim 1 wherein the binding/release pedal is angularly offset relative to said lock shaft both in binding and release engagement positions relative to said lock shaft.

3. The wheel brake as defined in claim 2 wherein said binding/release pedal is angularly offset relative to said lock shaft at a slightly greater angle when in binding engagement with said lock shaft.

4. The wheel brake as defined in claim 3 wherein said binding/release spring means maintains the inner end of said binding/release pedal in engagement with the undersurface of said substantially horizontal directed upper wall throughout the relative angular offset movement thereof.

5. The wheel brake as defined in claim 4 wherein both the return spring means and the binding/release spring means are coil springs surrounding the lock shaft.

6. The wheel brake as defined in claim 5 wherein the brake shoe comprises an inverted U-shaped element including a connecting wall portion and depending walls extending downwardly therefrom, outer free ends of said depending walls being adapted to engage said wheel while said connecting wall is deformed for spring action engagement with said wheel.

7. The wheel brake as defined in claim 6 wherein said angularly offset inner wall section is part of an inverted U-shaped bracket having depending side sections which are secured to the depending arms of said yoke.

8. The wheel brake as defined in claim 1 wherein said stop pedal extends above said yoke and has a red colored stop sign shape.

9. The wheel brake as defined in claim 1 wherein said binding/release pedal extends laterally beyond said yoke and has a green colored non-stop sign shape.

* * * * *